United States Patent
Pham Van et al.

(10) Patent No.: US 11,290,726 B2
(45) Date of Patent: Mar. 29, 2022

(54) INTER-INTRA PREDICTION MODE FOR VIDEO DATA

(71) Applicant: QUALCOMM Incorporated, San Diego, CA (US)

(72) Inventors: Luong Pham Van, San Diego, CA (US); Geert Van der Auwera, Del Mar, CA (US); Adarsh Krishnan Ramasubramonian, Irvine, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/781,751

(22) Filed: Feb. 4, 2020

(65) Prior Publication Data

US 2020/0260091 A1 Aug. 13, 2020

Related U.S. Application Data

(60) Provisional application No. 62/802,515, filed on Feb. 7, 2019.

(51) Int. Cl.
*H04N 19/159* (2014.01)
*H04N 19/176* (2014.01)
(Continued)

(52) U.S. Cl.
CPC ......... *H04N 19/159* (2014.11); *H04N 19/176* (2014.11); *H04N 19/186* (2014.11); *H04N 19/1883* (2014.11)

(58) Field of Classification Search
CPC .. H04N 19/159; H04N 19/176; H04N 19/186; H04N 19/1883
(Continued)

(56) References Cited

U.S. PATENT DOCUMENTS 9,374,578 B1 6/2016 Mukherjee et al.
9,906,786 B2 2/2018 Seregin et al.
(Continued)

FOREIGN PATENT DOCUMENTS

CN 107995489 A 5/2018
WO 2019147910 A1 8/2019

OTHER PUBLICATIONS

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16); URL: http://phenix.int-evry.fr/jvet/,, No. JVET-A1001 Feb. 24, 2016 (Feb. 24, 2016), XP030150000, 27 pages.
(Continued)

*Primary Examiner* — Nguyen T Truong
(74) *Attorney, Agent, or Firm* — Qualcomm Incorporated

(57) ABSTRACT

An example device for coding (encoding or decoding) video data includes a memory for storing video data and one or more processors implemented in circuitry and configured to form an inter-prediction block for a current chrominance block of the video data; form an intra-prediction block for the current chrominance block of the video data; determine a number of neighboring blocks to a luminance block corresponding to the current chrominance block that are intra-prediction coded; determine a first weight and a second weight according to the number of neighboring blocks that are intra-prediction coded; apply the first weight to the inter-prediction block and the second weight to the intra-prediction block; combine the first weighted inter-prediction block and the second weighted intra-prediction block to form a prediction block for the current chrominance block; and code the current chrominance block using the prediction block.

40 Claims, 8 Drawing Sheets

FIG. 1

(51) Int. Cl.
*H04N 19/186* (2014.01)
*H04N 19/169* (2014.01)

(58) Field of Classification Search
USPC .................................................... 375/240.12
See application file for complete search history.

(56) References Cited

U.S. PATENT DOCUMENTS

| | | | |
|---|---|---|---|
| 2017/0251213 | A1 | 8/2017 | Ye et al. |
| 2018/0249156 | A1 | 8/2018 | Heo et al. |
| 2018/0376148 | A1 | 12/2018 | Zhang et al. |
| 2018/0376149 | A1 | 12/2018 | Zhang et al. |
| 2019/0068992 | A1 | 2/2019 | Tourapis et al. |
| 2020/0162728 | A1 | 5/2020 | Van Der Auwera et al. |

OTHER PUBLICATIONS

Chiang M., et al., "CE1 0.1.1: Multi-hypothesis Prediction for Improving AMVP Mode, Skip or Merge Mode, and Intra Mode," 12th JVET Meeting, Oct. 3, 2018-Oct. 12, 2018, Macao, (The Joint Video Exploration Team Of ISO/IEC JTC1/SC29/WG11 and ITU-T SG.16), No. JVET-L0100, Oct. 12, 2018 (Oct. 12, 2018), XP030195410, 14 pages, Retrieved from the Internet: URL: http://phenix.int-evry.fr/jvet/doc_end_user/documents/12_Macao/wg11/JVET-L0100-v3.zip JVET-L0100-v3.docx, 14 pages, [retrieved on Oct. 12, 2018] paragraph [02.3].

Ergen S., "ZigBee/IEEE 802.15.4 Summary", Sep. 10, 2004, 37 Pages.

IEEE Std 802.11 ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.265, "Series H: Audiovisual and Multimedia Systems, Infrastructure of audiovisual services—Coding of moving video, High efficiency video coding," The International Telecommunication Union. Dec. 2016, 664 Pages.

U.S. Appl. No. 16/684,379, filed Nov. 14, 2019.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bross B., et al., "Versatile Video Coding (Draft 3)", 12. JVET Meeting;, Oct. 3, 2010-Oct. 12, 2018, MACAO; (The Joint Video Exploration Team of ISO/IEC JTC1/SC29/WG11 and ITU-T SG.16), No. JVET-L1001, Dec. 20, 2018 (Dec. 20, 2018), XP030200071, 236 pages, Retrieved from the Internet:URL: http://phenix.int-evry.fr/jvet/doc_end_user/documents/12_Macao/wg11/JVET-L1001-v11.zip JVET-L1001-v7.docx, [retrieved on Dec. 20, 2018], Abstract, Sections 7.3.4.6. 7.3.4.8, Section 8.3.6.

Dias A.S., et al., "CE10-Related: Multi-Hypothesis Intra with Weighted Combination," 13. JVET Meeting, Jan. 9, 2019-Jan. 18, 2019, Marrakech, (The Joint Video Exploration Team of ISO/IEC JTC1/SC29/WG11 and ITU-T SG.16), No. JVET-M0454, Jan. 13, 2019 (Jan. 13, 2019). XP030201992, 4 pages, Retrieved from the Internet: URL: http://phenix.int-evry.fr/jvet/doc_end_user/documents/13_Marrakech/wg11/JVET-M0454-v2.zip JVET-M054-v1 docx [retrieved on Jan. 13, 2019], abstract; table 1, Sections 1 and 2.

Hsu C-W., et al., BoG Report on CE10 Related Contributions, 13. JVET Meeting; Jan. 9, 2019-Jan. 18, 2019; Marrakech; (The Joint Video Exploration Team of ISO/IEC JTC1/SC29/WG11 and ITU-TSG.16 ), No. JVET-M0873, Jan. 15, 2019 (Jan. 15, 2019), XP030202270, 23 pages, Retrieved from the Internet: URL:http://phenix.int-evry.fr/jvet/doc_end_user/documents/13_Marrakech/wg11/JVET-M0873-v2.zip JVET-M0873-v2.docx [retrieved on Jan. 15, 2019], Sections 1.1.2 and 2.

International Search Report and Written Opinion—PCT/US2020/016877—ISA/EPO—dated May 7, 2020.

Van L.P., (Qualcomm) et al., "CE10-related: Inter-Intra Prediction Combination, 13. JVET Meeting; Jan. 9, 2019-Jan. 18, 2019; Marrakech; (The Joint Video Exploration Team of ISO/IEC JTC1/SC29/WG11 and ITU-TSG.16), No. JVET-M0096, Jan. 10, 2019 (Jan. 10, 2019), 4 Pages, XP030201274, Retrieved from the Internet: URL: http://phenix.int-evry.fr/jvet/doc_end_user/documents/13_Marrakech/wg11/JVET-M0096-v4.zip JVET-M0096_v3.docx, [retrieved on Jan. 10, 2019], abstract; figure 2,Sections 1-3.

INTER-INTRA PREDICTION MODE FOR VIDEO DATA

This application claims the benefit of U.S. Provisional Application No. 62/802,515, filed Feb. 7, 2019, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for performing combined inter-intra prediction. That is, in video coding, a video coder (e.g., a video encoder or a video decoder) may perform block-based coding of pictures forming a video sequence. The video coder may code blocks of the picture by forming a prediction block and coding a residual block representing sample-by-sample differences between the prediction block and the actual block to be coded. Inter-prediction represents prediction from a reference block of a previously coded picture, while intra-prediction represents prediction from previously coded reference data of the current picture. Combined inter-intra prediction represents prediction using both inter-prediction and intra-prediction. In particular, this disclosure describes improved techniques for performing combined inter-intra prediction. The techniques of this disclosure may be used in, e.g., Versatile Video Coding (VVC) or other video coding standards that support combined inter-intra prediction.

In one example, a method of coding video data includes forming an inter-prediction block for a current chrominance block of video data; forming an intra-prediction block for the current chrominance block of the video data; determining a number of neighboring blocks to a luminance block corresponding to the current chrominance block that are intra-prediction coded; determining a first weight and a second weight according to the number of neighboring blocks that are intra-prediction coded; applying the first weight to the inter-prediction block and the second weight to the intra-prediction block; combining the first weighted inter-prediction block and the second weighted intra-prediction block to form a prediction block for the current chrominance block; and coding the current chrominance block using the prediction block.

In another example, a device for coding video data includes a memory for storing video data and one or more processors implemented in circuitry and configured to form an inter-prediction block for a current chrominance block of the video data; form an intra-prediction block for the current chrominance block of the video data; determine a number of neighboring blocks to a luminance block corresponding to the current chrominance block that are intra-prediction coded; determine a first weight and a second weight according to the number of neighboring blocks that are intra-prediction coded; apply the first weight to the inter-prediction block and the second weight to the intra-prediction block; combine the first weighted inter-prediction block and the second weighted intra-prediction block to form a prediction block for the current chrominance block; and code the current chrominance block using the prediction block.

In another example, a computer-readable storage medium has stored thereon instructions that, when executed, cause a processor to form an inter-prediction block for a current chrominance block of video data; form an intra-prediction block for the current chrominance block of the video data; determine a number of neighboring blocks to a luminance block corresponding to the current chrominance block that are intra-prediction coded; determine a first weight and a second weight according to the number of neighboring blocks that are intra-prediction coded; apply the first weight to the inter-prediction block and the second weight to the intra-prediction block; combine the first weighted inter-prediction block and the second weighted intra-prediction block to form a prediction block for the current chrominance block; and code the current chrominance block using the prediction block.

In another example, a device for coding video data includes means for forming an inter-prediction block for a current chrominance block of video data; means for forming an intra-prediction block for the current chrominance block of the video data; means for determining a number of neighboring blocks to a luminance block corresponding to the current chrominance block that are intra-prediction coded; means for determining a first weight and a second weight according to the number of neighboring blocks that are intra-prediction coded; means for applying the first weight to the inter-prediction block and the second weight to the intra-prediction block; means for combining the first weighted inter-prediction block and the second weighted intra-prediction block to form a prediction block for the current chrominance block; and means for coding the current chrominance block using the prediction block.

The details of one or more examples are set forth in the accompanying drawings and the description below. Other features, objects, and advantages will be apparent from the description, drawings, and claims.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

High-Efficiency Video Coding (HEVC), was finalized by the Joint Collaboration Team on Video Coding (JCT-VC) of ITU-T Video Coding Experts Group (VCEG) and ISO/IEC Motion Picture Experts Group (MPEG) in April 2013.

The Joint Video Experts Team (WET), a collaborative team formed by MPEG and ITU-T Study Group 16's VCEG is recently working on a new video coding standard to be known as Versatile Video Coding (VVC). The primary objective of VVC is to provide a significant improvement in compression performance over the existing HEVC standard, aiding in deployment of higher-quality video services and emerging applications such as 360° omnidirectional immersive multimedia and high-dynamic-range (HDR) video.

This disclosure describes techniques that may improve combined inter-intra prediction mode for prediction of video data. The multi-hypothesis intra mode (MHI) has been shown to improve merge mode by combining one intra-prediction and one merge indexed prediction, and was adopted in the 12$^{th}$ JVET Macao meeting: M.-S. Chiang, C.-W. Hsu, Y.-W. Huang, S.-M. Lei "CE10.1.1: Multi-hypothesis prediction for improving AMVP mode, skip or merge mode, and intra mode," in JVET-L0100, October 2018. According to MHI, candidates in a set of 4 intra modes, including planar, DC, horizontal, and vertical predictions, are evaluated to select the optimal one to combine with a merge indexed prediction. In the combining process set forth in the example above, if planar or DC mode is selected, or the size of the block is smaller than 4, equal weights are deployed. Otherwise, the weights for intra and inter predicted samples (wIntra, wInter) are different based on the region of the samples within the coding block.

This disclosure recognizes that in the inter-intra prediction techniques described in JVET-L0100, the coding information of neighbouring blocks have not been utilized to improve coding performance of these tools. Furthermore, the region-based weight is employed for the horizontal and vertical prediction modes, which may cause artifacts along the region boundaries.

The techniques of this disclosure may improve the performance of inter-intra coding. These improvements may result from a position-independent weight scheme of these techniques. According to the techniques of this disclosure, the weights for inter and intra prediction samples may adaptively be determined using coding information, e.g., the number of intra-coded neighbor blocks, number of inter prediction of the merge indexed blocks (uni- or bi-prediction), and/or the size of the current block.

Figure 1:
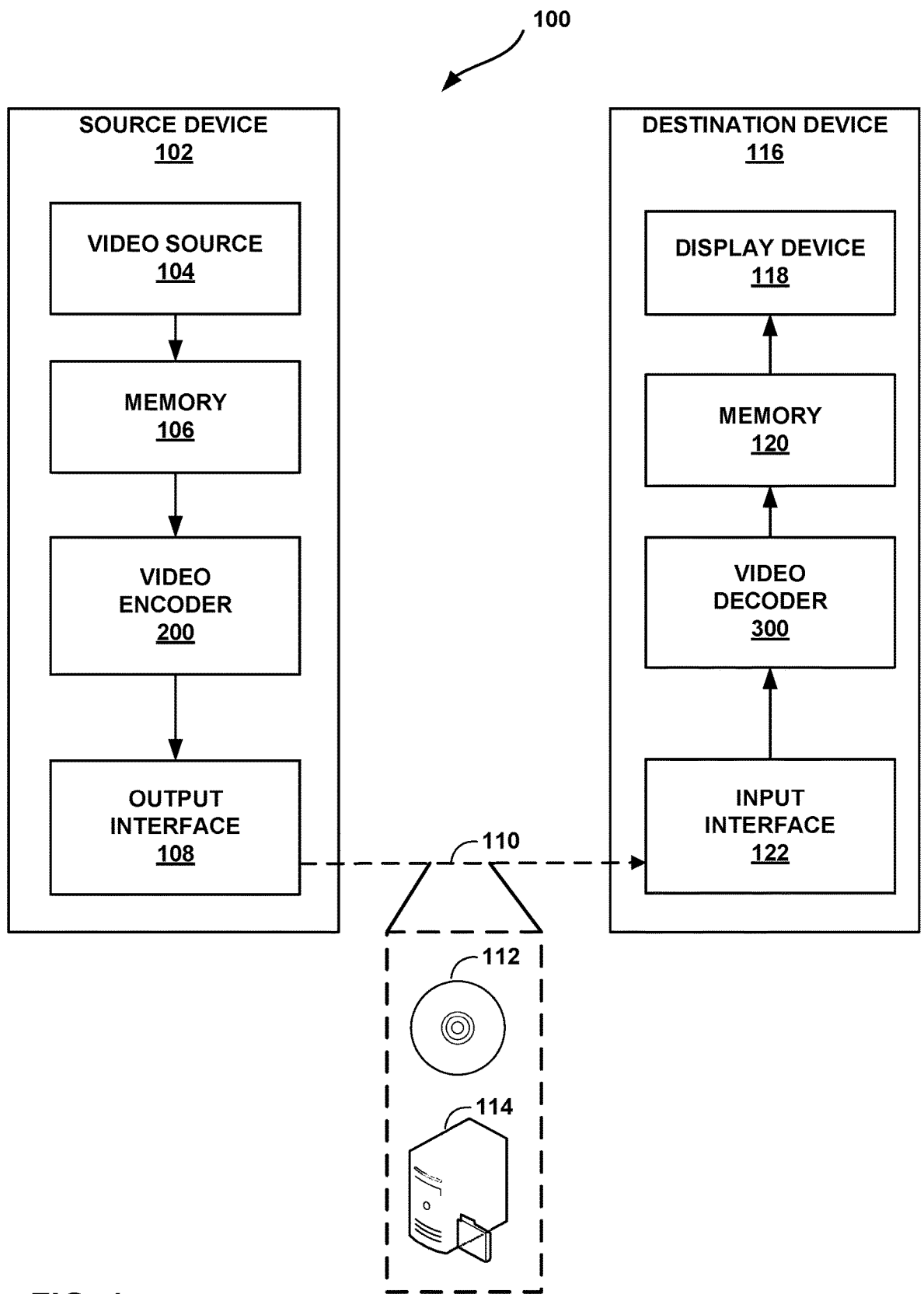
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for inter-intra coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for inter-intra coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

In accordance with the techniques of this disclosure, video encoder 200 may perform inter-intra prediction of blocks of video data (e.g., CUs). That is, video encoder 200 may form a prediction block using both an inter-prediction block and an intra-prediction block. Video encoder 200 may form the ultimate prediction block for a current block by performing a weighted combination of samples of the inter-prediction block and the intra-prediction block. When a current block is a chrominance block, video encoder 200 may determine the weights according to a number of neighboring blocks to a luminance block corresponding to the current chrominance block that are intra-prediction coded (and/or a number of blocks that are inter-prediction coded). That is, rather than determining the weights according to neighboring blocks to the current chrominance block, video encoder 200 may determine the number of intra- and/or inter-predicted blocks neighboring the luminance block corresponding to the current chrominance block, then determine the weights based on the number of intra- and/or inter-predicted blocks neighboring the luminance block.

As an example, video encoder 200 may determine whether an above-neighboring block and/or a left-neighboring block to the corresponding luminance block are inter-predicted. When neither of these neighboring blocks is inter-predicted, video encoder 200 may determine a weight of 3 to be applied to the intra-prediction block and a weight of 1 to be applied to the inter-prediction block. When both of these neighboring blocks is inter-predicted, video encoder 200 may determine a weight of 3 to be applied to the inter-prediction block and a weight of 1 to be applied to the intra-prediction block. When one of these neighboring blocks is inter-predicted and the other is intra-predicted, video encoder 200 may determine weights of 2 to be applied to both the inter-prediction block and the intra-prediction block. In some examples, video encoder 200 may count neighboring blocks predicted using inter-intra prediction and/or intra-block copy as inter-prediction coded blocks. Video decoder 300 may perform substantially the same process for determining weights to be applied to the inter- and intra-prediction blocks for a current chrominance block based on prediction modes for neighboring blocks to a luminance block corresponding to the current chrominance block.

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and/or video decoder 300 may be configured to perform inter-intra coding. That is, video encoder 200 and/or video decoder 300 may predict a block of video data using combined inter-intra prediction in accordance with any or all of the techniques described herein.

For example, video encoder 200 and video decoder 300 may adaptively determine weights to apply to samples of an inter-prediction and to an intra-prediction based on a position-independent weight scheme. For example, video encoder 200 and video decoder 300 may adaptively determine the weights according to (e.g., as a function of) coding information, such as the number of intra- and/or inter-coded neighbor blocks, number of inter prediction of the merge indexed blocks (uni- or bi-prediction), the size of the current block. Let (wInter, wIntra) be the weights for inter and intra prediction samples in the description below. That is, wInter represents a weight value applied to samples of an inter-prediction block, and wIntra represents a weight value applied to samples of an intra-prediction block. In some examples, wInter+wIntra=1, where wInter and wIntra are rational values between 0 and 1.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
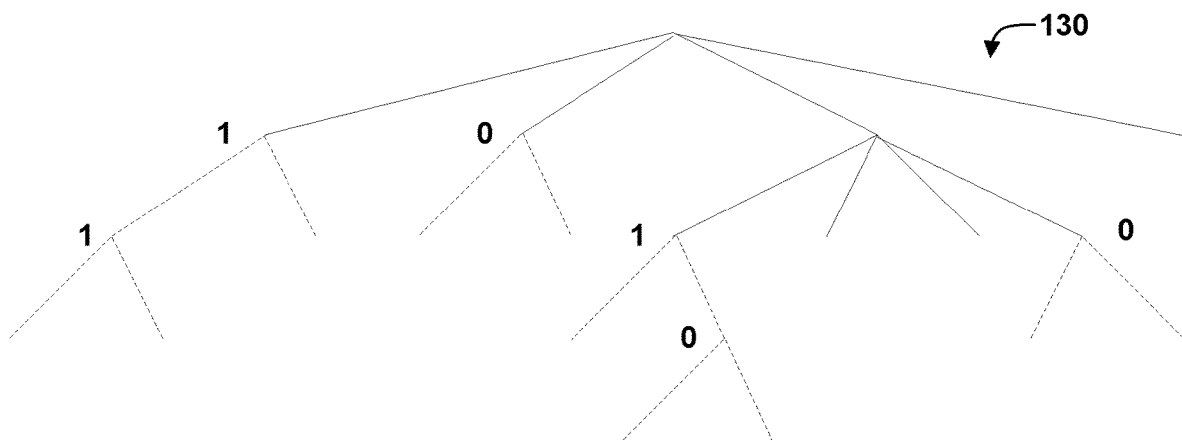
FIGS. 2A and 2B are conceptual diagrams illustrating an example quadtree binary tree (QTBT) structure, and a corresponding coding tree unit (CTU).
Figure 2B:
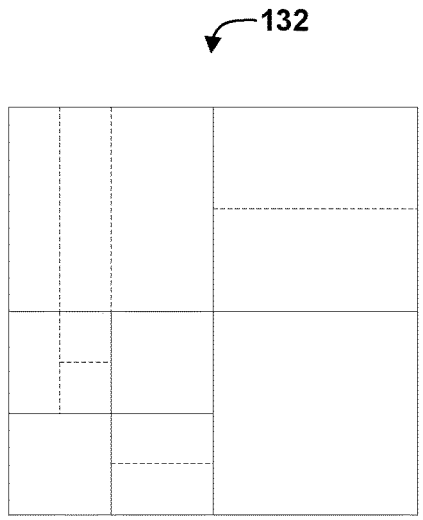

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT- Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3A:
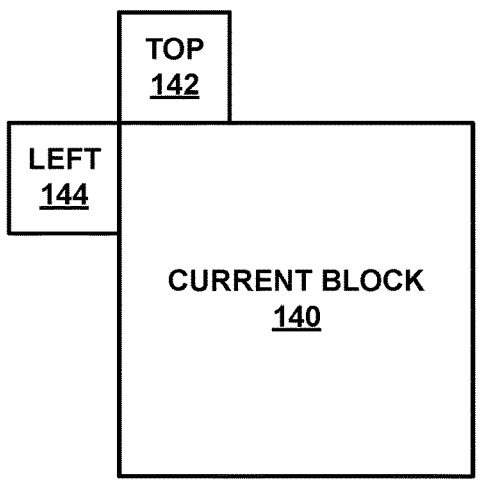
FIGS. 3A-3F are conceptual diagrams illustrating example locations of neighboring blocks to current blocks.
Figure 3B:
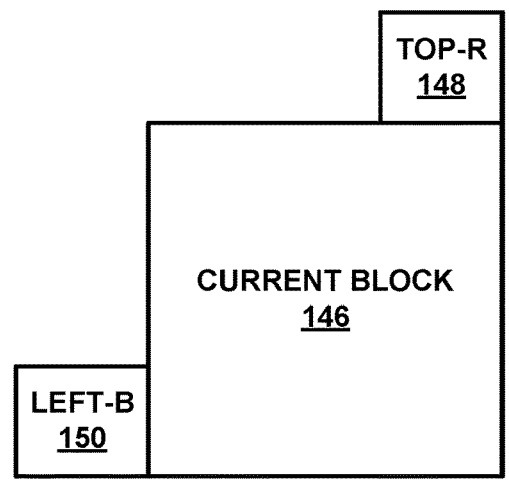
Figure 3C:
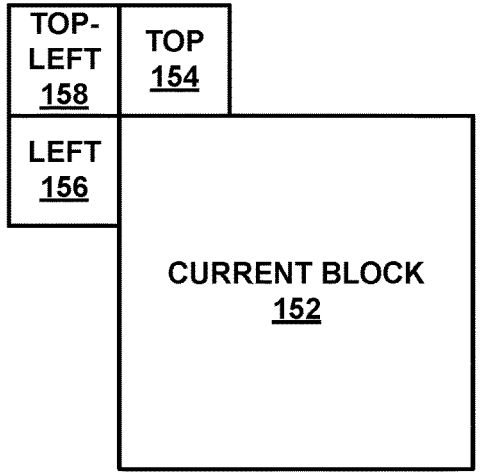
Figure 3D:
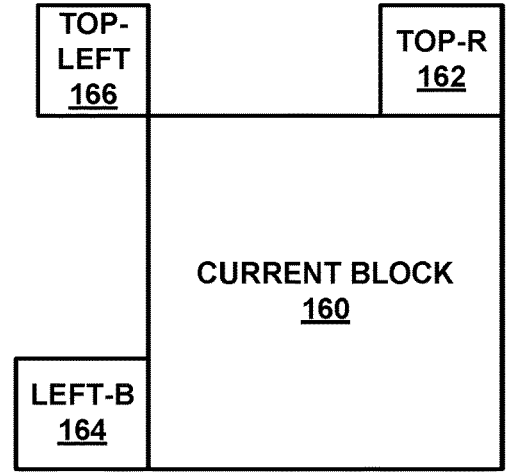
Figure 3E:
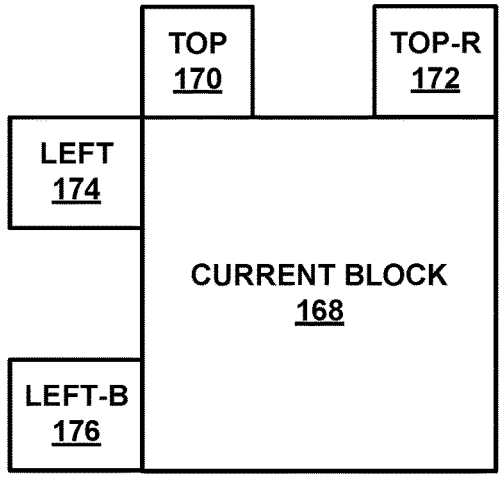
Figure 3F:
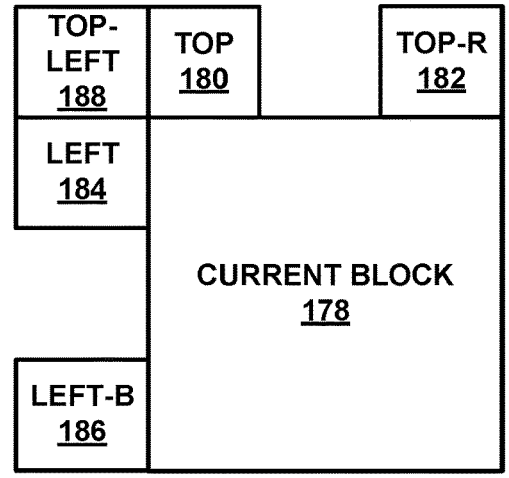

FIGS. 3A-3F are conceptual diagrams illustrating example locations of neighboring blocks to current blocks. In particular, FIG. 3A represents an example of current block 140 having top neighbor block 142 and left neighbor block 144, FIG. 3B represents an example of current block 146 having top-right neighbor block 148 and left-bottom neighbor block 150, FIG. 3C represents an example of current block 152 having top neighbor block 154, left neighbor block 156, and top-left (top-l) neighbor block 158, FIG. 3D represents an example of current block 160 having top-right neighbor block 162, left-bottom (left-b) neighbor block 164, and top-left neighbor block 166, FIG. 3E represents an example of current block 168 having top neighbor block 170, top-right neighbor block 172, left neighbor block 174, and left-bottom neighbor block 176, and FIG. 3F represents an example of current block 178 having top neighbor block 180, top-right neighbor block 182, left neighbor block 184, left-bottom neighbor block 186, and top-left neighbor block 188.

In accordance with the techniques of this disclosure, video encoder 200 and video decoder 300 may adaptively determine weights for intra- and inter-samples based on a number of intra- and/or inter-coded neighbor blocks, e.g., as discussed in U.S. application Ser. No. 16/684,379, filed Nov. 14, 2019, the entire contents of which are hereby incorporated by reference. However, according to the techniques of this disclosure, video encoder 200 and video decoder 300 may blend only inter- and intra-prediction samples, without position-dependent intra prediction combination (PDPC). Video encoder 200 and video decoder 300 may use reference neighbor blocks to determine weights, where the reference neighbor blocks may be any combination of top, top-right, top-left, left, or left-bottom neighbor blocks, e.g., as shown in the various examples of FIGS. 3A-3F.

In one example, e.g., as shown in FIG. 3A, video encoder 200 and video decoder 300 use top neighbor block 142 and left neighbor block 144 to determine weights to apply to intra- and inter-prediction samples for inter-intra prediction of current block 140. That is, top neighbor block 142 and left neighbor block 144 are used for intra coded neighbor checking for current block 140, in this example.

In another example, e.g., as shown in FIG. 3B, video encoder 200 and video decoder 300 use top-right neighbor block 148 and left-bottom neighbor block 150 to determine weights to apply to intra- and inter-prediction samples for inter-intra prediction of current block 146. That is, top-right neighbor block 148 and left-bottom neighbor block 150 are used for intra coded neighbor checking for current block 146, in this example.

In another example, e.g., as shown in FIG. 3C, top neighbor block 154, left neighbor block 156, and top-left neighbor block 158 are used for intra coded neighbor checking for current block 152.

In another example, e.g., as shown in FIG. 3D, top-right neighbor block 162, left-bottom neighbor block 164, and top-left neighbor block 166 are used for intra coded neighbor checking for current block 160.

In another example, e.g., as shown in FIG. 3E, top neighbor block 170, top-right neighbor block 172, left neighbor block 174, and left-bottom neighbor block 176 are used for intra coded neighbor checking for current block 168.

In another example, e.g., as shown in FIG. 3F, top neighbor block 180, top-right neighbor block 182, left neighbor block 184, left-bottom neighbor block 186, and top-left neighbor block 188 are used for intra coded neighbor checking for current block 178.

In some examples, video encoder 200 and video decoder 300 select reference neighboring blocks according to block size of the current block (e.g., blkWidth and blkHeight). For example, if blkWidth and blkHeight are identical, video encoder 200 and video decoder 300 may use the combination of FIG. 3D, FIG. 3E, or FIG. 3F. In another example, if blkWidth and blkHeight are different, video encoder 200 and video decoder 300 may use top-r and left-b, e.g., as shown in FIG. 3B.

In another example, if blkWidth and blkHeight are identical, then video encoder 200 and video decoder 300 may select the neighbouring block positions symmetrically along the width and height dimensions of the current block, e.g., per the examples of FIGS. 3A-3F. On the other hand, if blkWidth and blkHeight are different, video encoder 200 and video decoder 300 may select the neighbouring block positions asymmetrically along the width and height dimensions of the current block. For example, if blkWidth is greater than blkHeight, video encoder 200 and video decoder 300 may select the neighbouring blocks as being top-r and left, whereas if blkWidth is smaller than blkHeight, video encoder 200 and video decoder 300 may select the neighbouring blocks as being left-b and top.

In some examples, if the checked neighboring block is IBC/CPR-encoded (intra block copy/current picture referencing), the neighboring block may be considered as an inter-coded block.

In some examples, if the checked neighboring block is IBC/CPR-encoded, the neighboring block may be considered as an intra-coded block.

In some examples, when a checked neighboring block is a combined intra-inter block, the neighboring block may be considered as an inter-coded block.

In some examples, when a checked neighboring block is a combined intra-inter block, the neighboring block may be considered as an intra-coded block.

In some examples, when a single luma-chroma coding tree or dual (separate) luma-chroma coding trees are enabled, video encoder 200 and video decoder 300 may determine the weights for blending of the chroma blocks according to the intra check of the corresponding luma block or the neighboring blocks of the corresponding luma block.

In some examples, when dual tree coding is enabled, video encoder 200 and video decoder 300 may determine the weights for blending of the chroma blocks according to the intra check of the neighboring chroma blocks.

Video encoder 200 and video decoder 300 may determine weights based on an intra check. Let wInter and wIntra be the weights for inter and intra samples in inter-intra blending. The weights may be normalized by $2^n$ with n being an integer number, which is equal to the sum of the weights. In other words, these weights may be normalized by 4, 8, 16, . . . , which is implementable with a simple right shift operation.

In some examples, if all the checked neighboring blocks are intra-coded, video encoder 200 and video decoder 300 may determine that the weight for intra samples is higher than that for inter samples (e.g., (wInter, wIntra)=(1, 3) or (wInter, wIntra)=(3, 5)).

In some examples, if all the checked neighboring blocks are not intra-coded, video encoder 200 and video decoder 300 may determine that the weight for intra samples is lower than that for inter samples (e.g., (wInter, wIntra)=(3, 1) or (wInter, wIntra)=(5, 3)).

In some examples, if only one of the checked neighboring blocks is intra-coded, video encoder 200 and video decoder 300 may determine that the weights for intra and inter samples are identical.

In some examples, if the top-left, top-r, and left-b neighboring blocks are all intra coded, video encoder 200 and video decoder 300 may determine that the weights (wInter, wIntra) are (1, 3) or (3, 5). In another example, if at least one of top-left, top-r, or left-b neighboring blocks is intra-coded, video encoder 200 and video decoder 300 may set (wInter, wIntra) equal to (2, 2) or (4, 4). In yet another example, if all of top-left, top-r, and left-b neighboring blocks are not intra-coded, video encoder 200 and video decoder 300 may set (wInter, wIntra) equal to (3, 1) or (5, 3).

In some examples, if at least one of the checked blocks is MHI-encoded (multi-hypothesis intra) block, video encoder 200 and video decoder 300 may copy the weight for the current block from the weight of one of the checked blocks.

In some examples, if only one of these checked blocks is intra-coded, video encoder 200 and video decoder 300 may determine that the weight for intra samples is higher than that for inter samples (e.g., (wInter, wIntra)=(1, 3) or (wInter, wIntra)=(3, 5)).

In some examples, if only one of these checked blocks is intra-coded, video encoder 200 and video decoder 300 may determine that the weight for intra samples is lower than that for inter samples (e.g., (wInter, wIntra)=(3, 1) or (wInter, wIntra)=(5, 3)).

In some examples, if all these checked blocks are not intra-coded, video encoder 200 and video decoder 300 may determine that the weight for intra samples is higher than that for inter samples (e.g., (wInter, wIntra)=(1, 3) or (wInter, wIntra)=(3, 5)).

In some examples, video encoder 200 and video decoder 300 may determine (wInter, wIntra) according to the intra prediction mode of the checked neighboring blocks. In one example, if there is at least one neighbor block being coded using DC intra mode or planar mode, the weight for intra samples may be higher than that for inter samples (e.g., (wInter, wIntra)=(1, 3) or (wInter, wIntra)=(3, 5)).

In some examples, video encoder 200 and video decoder 300 may determine (wInter, wIntra) based on the number of inter prediction of the merge indexed block, that is, whether the merge index block is predicted using uni-directional or bi-directional prediction.

In some examples, if the merge indexed block is bi-prediction, video encoder 200 and video decoder 300 may set wInter higher than wIntra (e.g., (wInter, wIntra)=(3, 1) or (wInter, wIntra)=(5, 3)).

In some examples, if the merge indexed block is uni-prediction, video encoder 200 and video decoder 300 may set wInter higher than wIntra (e.g., (wInter, wIntra)=(3, 1) or (wInter, wIntra)=(5, 3)).

In some examples, if the merge indexed block is bi-prediction, video encoder 200 and video decoder 300 may set wInter higher than wIntra (e.g., (wInter, wIntra)=(3, 1) or (wInter, wIntra)=(5, 3)). Meanwhile, for a merge indexed block with uni-prediction, video encoder 200 and video decoder 300 may determine (wInter, wIntra) using the number of neighboring intra and/or inter-blocks, e.g., as discussed above.

In some examples, video encoder 200 and video decoder 300 may determine (wInter, wIntra) according to the size of the current block. The size (SIZEblk) of the current block is based on its width and height.

In some examples, video encoder 200 and video decoder 300 may determine the size of the current block as the minimum value of width and height of the current block. In another example, video encoder 200 and video decoder 300 may determine the size of the current block as the maximum value of width and height of the current block. In yet another example, video encoder 200 and video decoder 300 may determine the size of the current block by the multiplication (i.e., the product) of width and height of the current block. In still another example, video encoder 200 and video decoder 300 may determine the size of the current block by the summation of width and height of the current block.

In some examples, if SIZEblk is higher than a predefined threshold, video encoder 200 and video decoder 300 may set wInter higher or lower than wIntra (e.g., (wInter, wIntra)=(3, 1) or (wInter, wIntra)=(5, 3)).

In some examples, if SIZEblk is lower than a predefined threshold, video encoder 200 and video decoder 300 may set wInter higher or lower than wIntra (e.g., (wInter, wIntra)=(3, 1) or (wInter, wIntra)=(5, 3)).

In some examples, if the merge indexed block is bi-prediction, video encoder 200 and video decoder 300 may set wInter higher or lower than wIntra (e.g., (wInter, wIntra) =(3, 1) or (wInter, wIntra)=(5, 3)). Meanwhile for the merge indexed block with uni-prediction, video encoder 200 and video decoder 300 may determine (wInter, wIntra) adaptively according to the size of the current block.

In some examples, a weight pair set (wInter, wIntra) may be pre-defined. The weight pair set may be signaled in the bit stream header or sequence parameter set (SPS). That is, video encoder 200 may encode the weight pair set, while video decoder 300 may decode the weight pair set. During the encoding process of an MHI block, video encoder 200 may determine the best weight using rate-distortion (RD) evaluation. In this example, video encoder 200 may derive RD costs of all elements in the weight pair. Video encoder 200 may select the pair having the minimum RD cost to encode the current block and signal the index of this pair into the bit stream. Video encoder 200 may encode the index using a CABAC algorithm using bypass or context-based entropy encoding. Video decoder 300 may perform a decoding process to obtain the index to determine the weights (e.g., the pair of weights) to apply for a current block.

In some examples, video encoder 200 and video decoder 300 may code a list of weights in a parameter set (such as an SPS, a picture parameter set (PPS), a video parameter set (VPS), an adaptation parameter set (APS), or the like) or headers (tiles, slices, coding units, or the like) corresponding to the cases described in the above techniques that are based on checking neighboring block modes, block sizes, etc.

Figure 4:
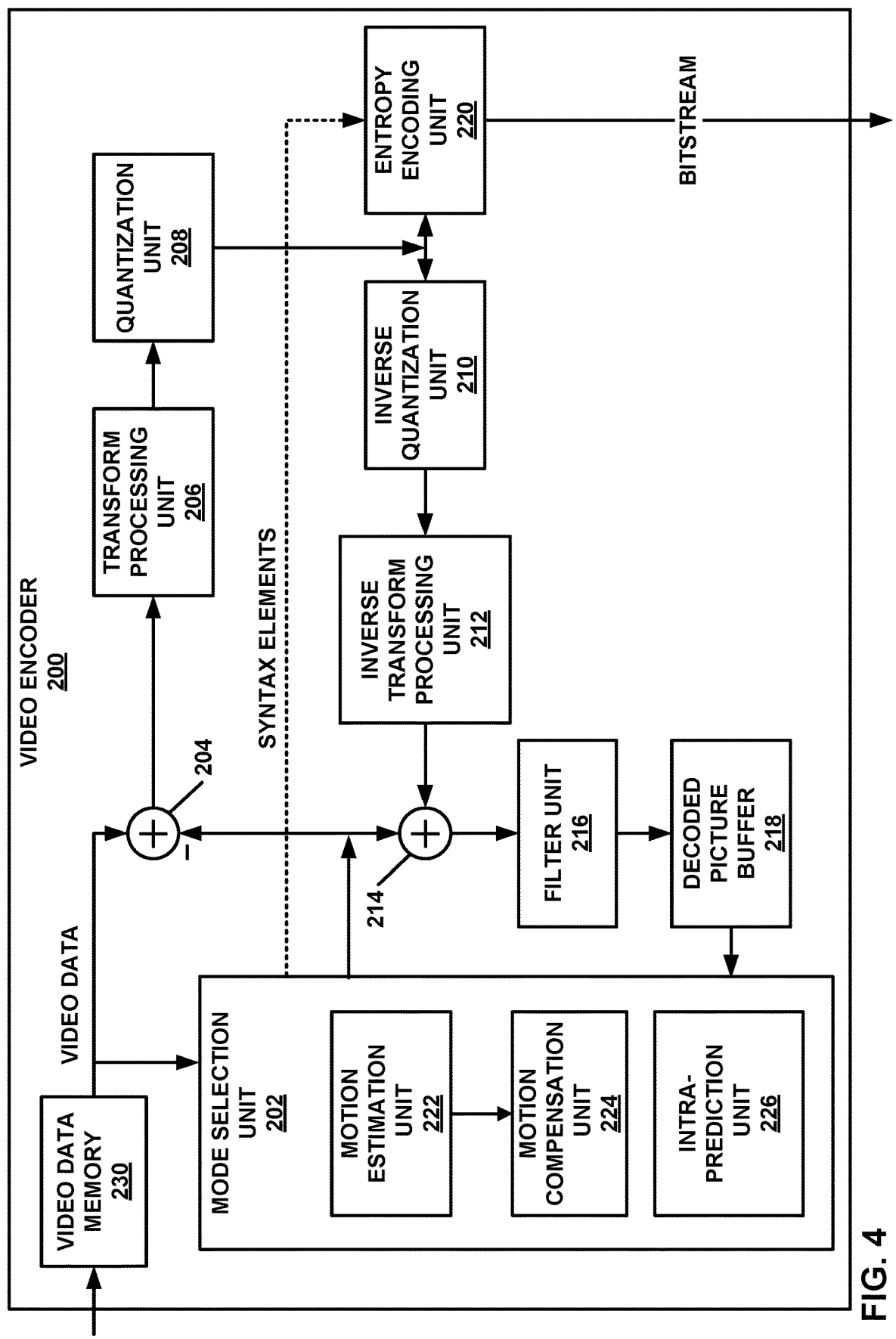
FIG. 4 is a block diagram illustrating an example video encoder that may perform the techniques of this disclosure.

FIG. 4 is a block diagram illustrating an example video encoder 200 that may perform the techniques of this disclosure. FIG. 4 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 4, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 4 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

In accordance with the techniques of this disclosure, mode selection unit 202 may perform inter-intra prediction of blocks of video data (e.g., CUs). That is, mode selection unit 202 may form a prediction block by causing motion estimation unit 222 and motion compensation unit 224 to form an inter-prediction block and intra-prediction unit 226 to form an intra-prediction block. Mode selection unit 202 may form the ultimate prediction block for a current block by performing a weighted combination of samples of the inter-prediction block and the intra-prediction block. When a current 28 block is a chrominance block, mode selection unit 202 may determine weights for performing the weighted prediction according to a number of neighboring blocks to a luminance block corresponding to the current chrominance block that are intra- and/or inter-prediction coded. That is, rather than determining the weights according to neighboring blocks to the current chrominance block, mode selection unit 202 may determine the number of inter-predicted blocks neighboring the luminance block corresponding to the current chrominance block, then determine the weights based on the number of inter-predicted blocks neighboring the luminance block.

As an example, mode selection unit 202 may determine whether an above-neighboring block and/or a left-neighboring block to the corresponding luminance block are inter-predicted. When neither of these neighboring blocks is inter-predicted, mode selection unit 202 may determine a weight of 3 to be applied to the intra-prediction block and a weight of 1 to be applied to the inter-prediction block. When both of these neighboring blocks is inter-predicted, mode selection unit 202 may determine a weight of 3 to be applied to the inter-prediction block and a weight of 1 to be applied to the intra-prediction block. When one of these neighboring blocks is inter-predicted and the other is intra-predicted, mode selection unit 202 may determine weights of 2 to be applied to both the inter-prediction block and the intra-prediction block. In some examples, mode selection unit 202 may count neighboring blocks predicted using inter-intra prediction and/or intra-block copy as inter-prediction coded blocks.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction.

Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generates syntax elements that indicate the manner in which to reconstruct the block based on a selected palette. In such modes, mode selection unit 202 may provide these syntax elements to entropy encoding unit 220 to be encoded.

In some examples, mode selection unit 202 may select an inter-intra prediction mode. In such examples, mode selection unit 202 may weight an inter-prediction block generated by motion compensation unit 224 and an intra-prediction block generated by intra-prediction unit 226 according to any of the various techniques of this disclosure. Mode selection unit 202 may generate a prediction block from the weighted inter- and intra-prediction blocks and output the generated prediction block.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 of FIG. 4 represents an example of a device for coding video data comprising one or more processors configured to form an inter-prediction block for a current block of video data; form an intra-prediction block for the current block of video data; apply a first weight to the inter-prediction block and a second weight to the intra-prediction block; combine the first weighted inter-prediction block and the second weighted intra-prediction block to form a prediction block for the current block; and code (i.e., encode, in this example) the current block using the prediction block.

Video encoder 200 also represents an example of a device for coding video data comprising one or more processors configured to form an inter-prediction block for a current chrominance block of video data; form an intra-prediction block for the current chrominance block of the video data; determine a number of neighboring blocks to a luminance block corresponding to the current chrominance block that are intra-prediction coded; determine a first weight and a second weight according to the number of neighboring blocks that are intra-prediction coded; apply the first weight to the inter-prediction block and the second weight to the intra-prediction block; combine the first weighted inter-prediction block and the second weighted intra-prediction block to form a prediction block for the current chrominance block; and code the current chrominance block using the prediction block.

Figure 5:
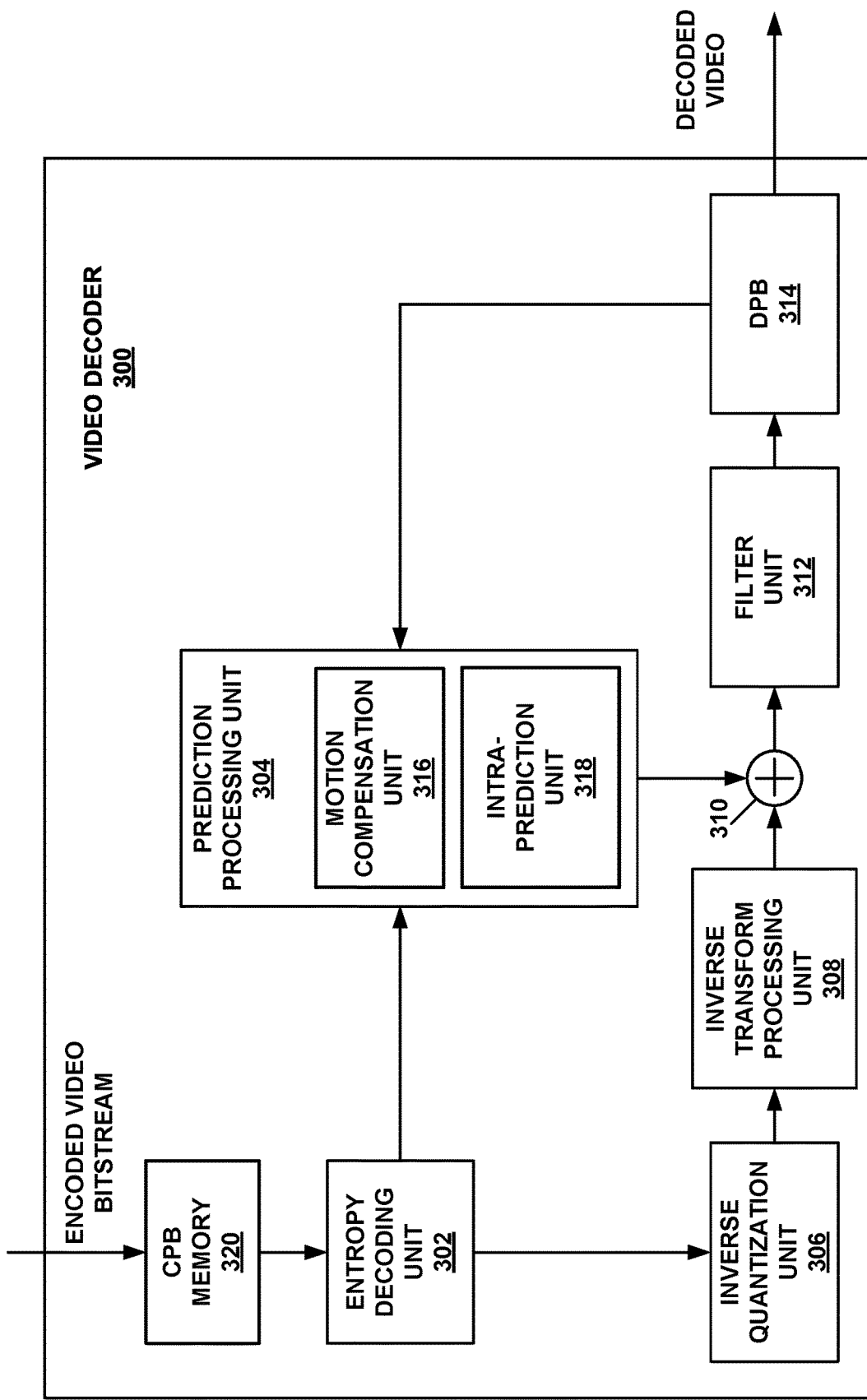
FIG. 5 is a block diagram illustrating an example video decoder that may perform the techniques of this disclosure.

FIG. 5 is a block diagram illustrating an example video decoder 300 that may perform the techniques of this disclosure. FIG. 5 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 5, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

In some examples, prediction processing unit 304 may select an inter-intra prediction mode. In such examples, prediction processing unit 304 may weight an inter-prediction block generated by motion compensation unit 316 and an intra-prediction block generated by intra-prediction unit 318 according to any of the various techniques of this disclosure. Prediction processing unit 304 may generate a prediction block from the weighted inter- and intra-prediction blocks and output the generated prediction block.

In accordance with the techniques of this disclosure, prediction processing unit 304 may perform inter-intra prediction of blocks of video data (e.g., CUs). That is, prediction processing unit 304 may form a prediction block by causing motion compensation unit 316 to form an inter-prediction block and intra-prediction unit 318 to form an intra-prediction block. Prediction processing unit 304 may form the ultimate prediction block for a current block by performing a weighted combination of samples of the inter-prediction block and the intra-prediction block. When a current block is a chrominance block, prediction processing unit 304 may determine weights for performing the weighted prediction according to a number of neighboring blocks to a luminance block corresponding to the current chrominance block that are intra-prediction coded. That is, rather than determining the weights according to neighboring blocks to the current chrominance block, prediction processing unit 304 may determine the number of intra-predicted blocks neighboring the luminance block corresponding to the current chrominance block, then determine the weights based on the number of intra-predicted blocks neighboring the luminance block.

As an example, prediction processing unit 304 may determine whether an above-neighboring block and/or a left-neighboring block to the corresponding luminance block are inter-predicted. When neither of these neighboring blocks is inter-predicted, prediction processing unit 304 may determine a weight of 3 to be applied to the intra-prediction block and a weight of 1 to be applied to the inter-prediction block. When both of these neighboring blocks are inter-predicted, prediction processing unit 304 may determine a weight of 3 to be applied to the inter-prediction block and a weight of 1 to be applied to the intra-prediction block. When one of these neighboring blocks is inter-predicted and the other is intra-predicted, prediction processing unit 304 may determine weights of 2 to be applied to both the inter-prediction block and the intra-prediction block. In some examples, prediction processing unit 304 may count neighboring blocks predicted using inter-intra prediction and/or intra-block copy as inter-prediction coded blocks.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 5 are illustrated to assist with understanding the operations performed by video decoder 300. The units may be implemented as fixed-function circuits, programmable circuits, or a combination thereof. Similar to FIG. 4, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 4).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 4). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

Video decoder 300 of FIG. 5 represents an example of a device for coding video data comprising one or more processors configured to form an inter-prediction block for a current block of video data; form an intra-prediction block for the current block of video data; apply a first weight to the inter-prediction block and a second weight to the intra-prediction block; combine the first weighted inter-prediction block and the second weighted intra-prediction block to form a prediction block for the current block; and code (i.e., decode, in this example) the current block using the prediction block.

Video decoder 300 also represents an example of a device for coding video data comprising one or more processors configured to form an inter-prediction block for a current chrominance block of video data; form an intra-prediction block for the current chrominance block of the video data; determine a number of neighboring blocks to a luminance block corresponding to the current chrominance block that are intra-prediction coded; determine a first weight and a second weight according to the number of neighboring blocks that are intra-prediction coded; apply the first weight to the inter-prediction block and the second weight to the intra-prediction block; combine the first weighted inter-prediction block and the second weighted intra-prediction block to form a prediction block for the current chrominance block; and code the current chrominance block using the prediction block.

Figure 6:
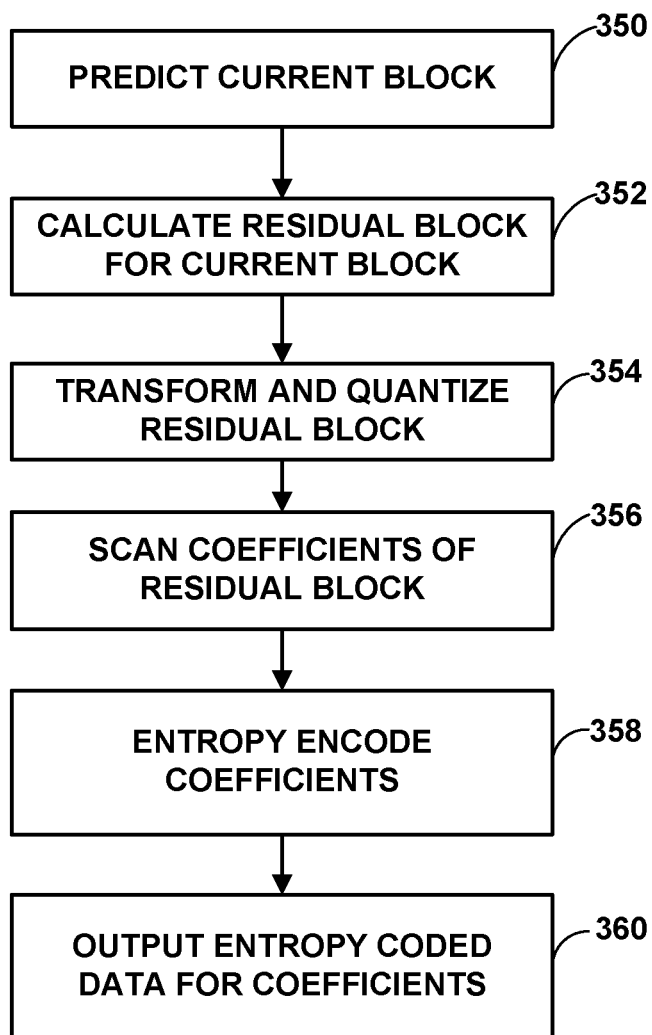
FIG. 6 is a flowchart illustrating an example method for encoding a current block in accordance with the techniques of this disclosure.

FIG. 6 is a flowchart illustrating an example method for encoding a current block in accordance with the techniques of this disclosure. The current block may comprise a current CU. Although described with respect to video encoder 200 (FIGS. 1 and 4), it should be understood that other devices may be configured to perform a method similar to that of FIG. 6.

In this example, video encoder 200 initially predicts the current block (350). For example, video encoder 200 may form a prediction block for the current block using inter-intra prediction according to the techniques of this disclosure. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

In this manner, the method of FIG. 6 represents an example of a method including forming an inter-prediction block for a current block of video data; forming an intra-prediction block for the current block of video data; applying a first weight to the inter-prediction block and a second weight to the intra-prediction block; combining the first weighted inter-prediction block and the second weighted intra-prediction block to form a prediction block for the current block; and coding (i.e., encoding) the current block using the prediction block.

Figure 7:
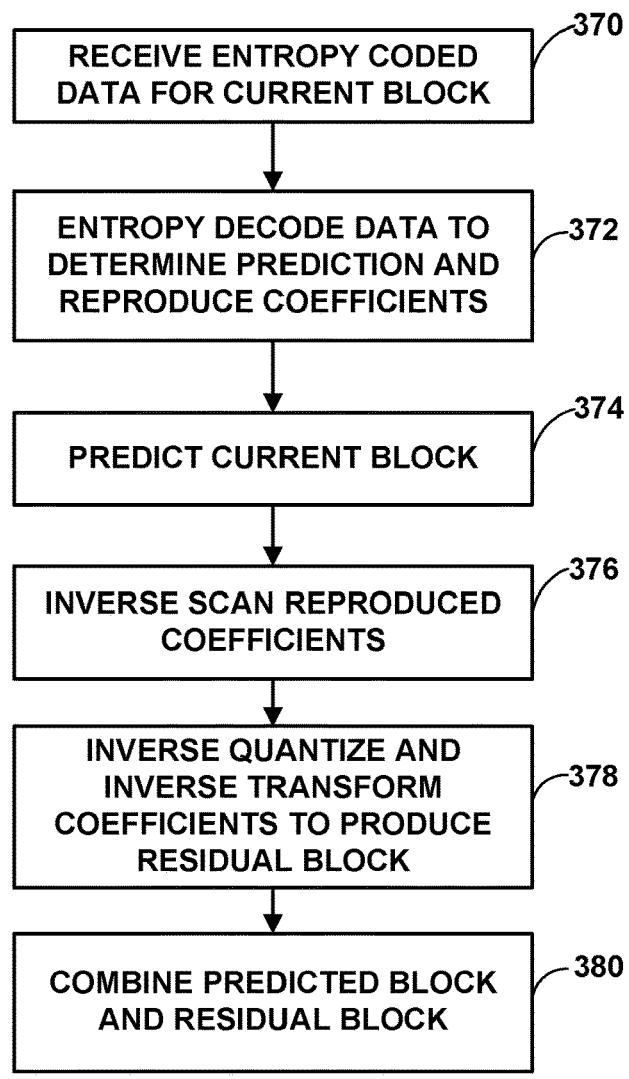
FIG. 7 is a flowchart illustrating an example method for decoding a current block in accordance with the techniques of this disclosure.

FIG. 7 is a flowchart illustrating an example method for decoding a current block in accordance with the techniques of this disclosure. The current block may comprise a current CU. Although described with respect to video decoder 300 (FIGS. 1 and 5), it should be understood that other devices may be configured to perform a method similar to that of FIG. 7.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using inter-intra prediction mode per the techniques of this disclosure, as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

In this manner, the method of FIG. 7 represents an example of a method including forming an inter-prediction block for a current block of video data; forming an intra-prediction block for the current block of video data; applying a first weight to the inter-prediction block and a second weight to the intra-prediction block; combining the first weighted inter-prediction block and the second weighted intra-prediction block to form a prediction block for the current block; and coding (i.e., decoding) the current block using the prediction block.

Figure 8:
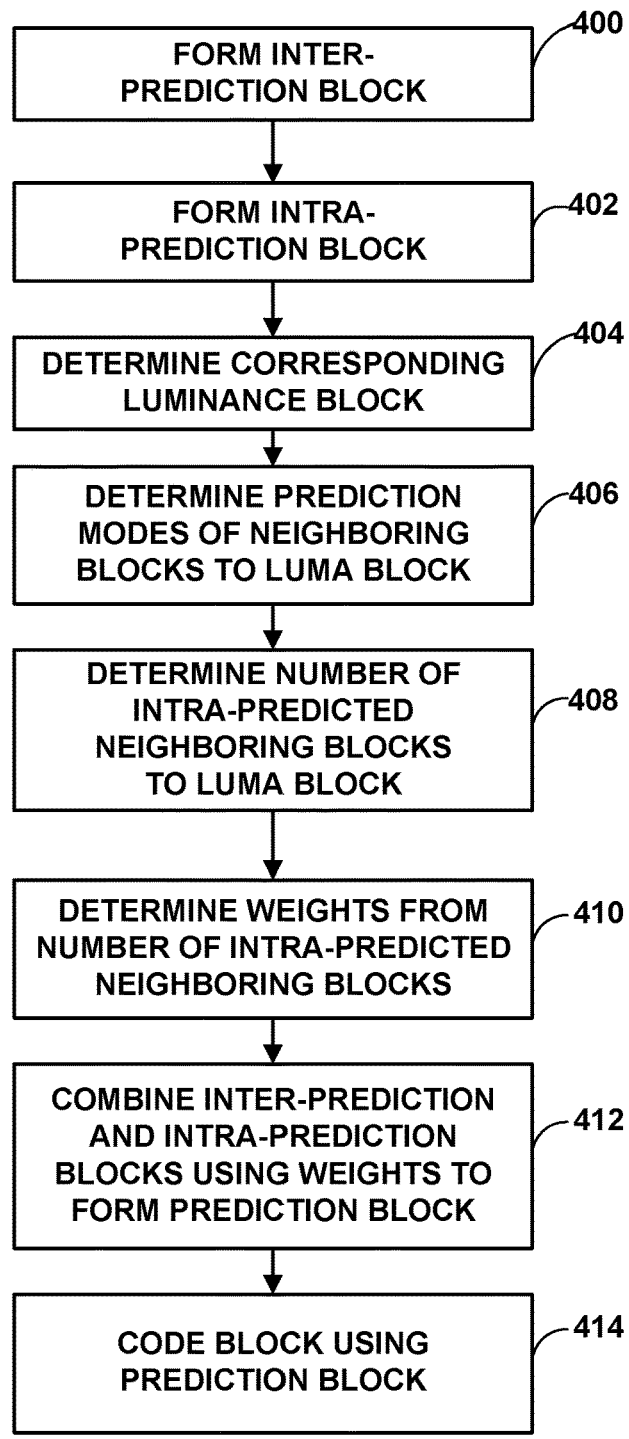
FIG. 8 is a flowchart illustrating an example method of coding (encoding or decoding) video data according to the techniques of this disclosure.

FIG. 8 is a flowchart illustrating an example method of coding (encoding or decoding) video data according to the techniques of this disclosure. For purposes of example and explanation, the method of FIG. 8 is explained with respect to video decoder 300 of FIGS. 1 and 5, although video encoder 200 of FIGS. 1 and 4 or other video coding devices may perform this or a similar method. The method of FIG. 8 may be performed by video encoder 200 when predicting a current chrominance block, e.g., at step 350 of the method of FIG. 6, or by video decoder 300 when predicting a current chrominance block at, e.g., step 374 of FIG. 7.

Initially, video decoder 300 forms an inter-prediction block for a current chrominance block (400). Video decoder 300 may also form an intra-prediction block for the current chrominance block (402). Video decoder 300 may then determine a luminance block corresponding to the chrominance block (404), e.g., a luminance block that is co-located with the chrominance block in a luminance array.

Video decoder 300 may then determine prediction modes of neighboring blocks to the luminance block (406). For example, video decoder 300 may determine prediction modes of top neighbor block 142 and left neighbor block 144 of FIG. 3A, top-right neighbor block 148 and left-bottom neighbor block 150 of FIG. 3B, or the like for other examples of neighboring blocks as shown in FIGS. 3A-3F. Video decoder 300 may also determine a number of intra-predicted neighboring blocks to the luminance block (408). Alternatively, video decoder 300 may determine a number of inter-predicted neighboring blocks to the luminance block.

Video decoder 300 may also determine weights to be applied to the inter-prediction block and the intra-prediction block according to the number of intra-predicted neighboring blocks to the luminance block (410). If there are more inter-predicted blocks than intra-predicted blocks, video decoder 300 may determine that the weight to be applied to the inter-prediction block is larger than the weight to be applied to the intra-prediction block. For instance, the weight to be applied to the inter-prediction block may be 3 and the weight to be applied to the intra-prediction block may be 1. If the number of intra-prediction blocks is greater than the number of inter-prediction blocks, video decoder 300 may determine that the weight to be applied to the intra-prediction block is larger than the weight to be applied to the inter-prediction block. For instance, the weight to be applied to the intra-prediction block may be 3 and the weight to be applied to the inter-prediction block may be 1. If the numbers of intra- and inter-prediction blocks are the same, the weights may be equal, e.g., 2 for each.

Video decoder 300 may then combine the inter-prediction block and the intra-prediction block using the weights to form a prediction block for the current chrominance block (412). Video decoder 300 may then code the current chrominance block using the prediction block (414).

In this manner, the method of FIG. 8 represents an example of a method of coding video data, the method comprising forming an inter-prediction block for a current chrominance block of video data; forming an intra-prediction block for the current chrominance block of the video data; determining a number of neighboring blocks to a luminance block corresponding to the current chrominance block that are intra-prediction coded; determining a first weight and a second weight according to the number of neighboring blocks that are intra-prediction coded; applying the first weight to the inter-prediction block and the second weight to the intra-prediction block; combining the first weighted inter-prediction block and the second weighted intra-prediction block to form a prediction block for the current chrominance block; and coding the current chrominance block using the prediction block.

Certain techniques of this disclosure are summarized in the following examples:

Example 1: A method of coding video data, the method comprising: forming an inter-prediction block for a current block of video data; forming an intra-prediction block for the current block of video data; applying a first weight to the inter-prediction block and a second weight to the intra-prediction block; combining the first weighted inter-prediction block and the second weighted intra-prediction block to form a prediction block for the current block; and coding the current block using the prediction block.

Example 2: The method of example 1, wherein coding the current block comprises decoding the current block, comprising: decoding a residual block for the current block; and combining samples of the residual block with samples of the prediction block.

Example 3: The method of any of examples 1 and 2, wherein coding the current block comprises encoding the current block, comprising: subtracting samples of the prediction block from samples of the current block to form a residual block; and encoding the residual block.

Example 4: The method of any of examples 1-3, further comprising determining the first weight and the second weight according to a number of intra-coded neighboring blocks to the current block.

Example 5: The method of example 4, wherein the neighboring blocks include a top neighboring block.

Example 6: The method of any of examples 4 and 5, wherein the neighboring blocks include a left neighboring block.

Example 7: The method of any of examples 4-6, wherein the neighboring blocks include a top-right neighboring block.

Example 8: The method of any of examples 4-7, wherein the neighboring blocks include a left-bottom neighboring block.

Example 9: The method of any of examples 4-8, wherein the neighboring blocks include a top-left neighboring block.

Example 10: The method of any of examples 4-9, further comprising determining the neighboring blocks according to a height of the current block and a width of the current block.

Example 11: The method of example 10, wherein when the height and the width are equal, the neighboring blocks include a top-right neighboring block and a left-bottom neighboring block.

Example 12: The method of example 11, wherein the neighboring blocks further include a top neighboring block and a left neighboring block.

Example 13: The method of example 12, wherein the neighboring blocks further include a top-left neighboring block.

Example 14: The method of any of examples 10-13, wherein when the height and the width are different, the neighboring blocks include a top-right neighboring block and a left-bottom neighboring block.

Example 15: The method of example 10, wherein when the height and the width are equal, the neighboring blocks are symmetric along the width and height dimensions of the current block, and when the height and width are not equal, the neighboring blocks are asymmetric along the width and height dimensions of the current block.

Example 16: The method of example 15, wherein when the width is greater than the height, the neighboring blocks include a top-right neighboring block and a left neighboring block, and when the height is greater than the width, the neighboring blocks include a top neighboring block and a left-bottom neighboring block.

Example 17: The method of any of examples 4-16, further comprising determining that one of the neighboring blocks that is intra block copy coded or current picture referencing coded is an inter-coded block.

Example 18: The method of any of examples 4-16, further comprising determining that one of the neighboring blocks that is intra block copy coded or current picture referencing coded is an intra-coded block.

Example 19: The method of any of examples 4-18, further comprising determining that one of the neighboring blocks that is inter-intra coded is an inter-coded block.

Example 20: The method of any of examples 4-18, further comprising determining that one of the neighboring blocks that is inter-intra coded is an intra-coded block.

Example 21: The method of any of examples 4-20, wherein determining the first weight and the second weight comprises selecting the second weight to be higher than the first weight when all of the neighboring blocks are intra-coded.

Example 22: The method of any of examples 4-21, wherein determining the first weight and the second weight comprises selecting the first weight to be higher than the second weight when at least one of the neighboring blocks is not intra-coded.

Example 23: The method of any of examples 4-22, wherein determining the first weight and the second weight comprises selecting the first weight to equal the second weight when only one of the neighboring blocks is intra-coded.

Example 24: The method of any of examples 4-23, wherein determining the first weight and the second weight comprises selecting the first weight to be 1 and the second weight to be 3 when a top-left neighboring block, a top-right neighboring block, and a left-bottom neighboring block to the current block are intra-coded.

Example 25: The method of any of examples 4-23, wherein determining the first weight and the second weight comprises selecting the first weight to be 3 and the second weight to be 5 when a top-left neighboring block, a top-right neighboring block, and a left-bottom neighboring block to the current block are intra-coded.

Example 26: The method of any of examples 4-25, wherein determining the first weight and the second weight comprises selecting the first weight to be 2 and the second weight to be 2 when at least one of a top-left neighboring block, a top-right neighboring block, or a left-bottom neighboring block to the current block is intra-coded.

Example 27: The method of any of examples 4-25, wherein determining the first weight and the second weight comprises selecting the first weight to be 4 and the second weight to be 4 when at least one of a top-left neighboring block, a top-right neighboring block, or a left-bottom neighboring block to the current block is intra-coded.

Example 28: The method of any of examples 4-27, wherein determining the first weight and the second weight comprises selecting the first weight to be 3 and the second weight to be 1 when none of a top-left neighboring block, a top-right neighboring block, and a left-bottom neighboring block to the current block is intra-coded.

Example 29: The method of any of examples 4-27, wherein determining the first weight and the second weight comprises selecting the first weight to be 5 and the second weight to be 3 when none of a top-left neighboring block, a top-right neighboring block, and a left-bottom neighboring block to the current block is intra-coded.

Example 30: The method of any of examples 4-29, wherein determining the first weight and the second weight comprises copying the first weight and the second weight from one of the neighboring blocks that is multi-hypothesis intra coded.

Example 31: The method of any of examples 4-30, wherein determining the first weight and the second weight comprises selecting the second weight to be higher than the first rate when only one of the neighboring blocks is intra-coded.

Example 32: The method of example 31, wherein the second weight is 3 and the first weight is 1.

Example 33: The method of example 31, wherein the second weight is 5 and the first weight is 3.

Example 34: The method of any of examples 4-30, wherein determining the first weight and the second weight comprises selecting the first weight to be higher than the second rate when only one of the neighboring blocks is intra-coded.

Example 35: The method of example 34, wherein the first weight is 3 and the second weight is 1.

Example 36: The method of example 34, wherein the first weight is 5 and the second weight is 3.

Example 37: The method of any of examples 4-30, wherein determining the first weight and the second weight comprises selecting the second weight to be higher than the first rate when none of the neighboring blocks is intra-coded.

Example 38: The method of example 37, wherein the second weight is 3 and the first weight is 1.

Example 39: The method of example 37, wherein the second weight is 5 and the first weight is 3.

Example 40: The method of any of examples 4-30, wherein determining the first weight and the second weight comprises selecting the second weight to be higher than the first rate when at least one of the neighboring blocks is predicted using DC intra mode or planar mode.

Example 41: The method of example 40, wherein the second weight is 3 and the first weight is 1.

Example 42: The method of example 40, wherein the second weight is 5 and the first weight is 3.

Example 43: The method of any of examples 1-42, further comprising determining the first weight and the second weight according to a luma block of one of the neighboring blocks when the one of the neighboring blocks has single luma-chroma coding tree or dual luma-chroma coding tree enabled.

Example 44: The method of any of examples 1-43, further comprising determining the first weight and the second weight according to a chroma block of one of the neighboring blocks when the one of the neighboring blocks has dual luma-chroma coding tree enabled.

Example 45: The method of any of examples 1-44, further comprising determining the first weight and the second weight according to a number of inter prediction of a merge indexed block.

Example 46: The method of example 45, wherein determining the first weight and the second weight comprises setting the first weight higher than the second weight when the merge indexed block is bi-prediction.

Example 47: The method of example 46, wherein the first weight is 3 and the second weight is 1.

Example 48: The method of example 46, wherein the first weight is 5 and the second weight is 3.

Example 49: The method of any of examples 46-48, wherein determining the first weight and the second weight comprises determining the first weight and the second weight according to one of examples 4-42 when the merge indexed block is uni-prediction.

Example 50: The method of example 45, wherein determining the first weight and the second weight comprises setting the first weight higher than the second weight when the merge indexed block is uni-prediction.

Example 51: The method of example 50, wherein the first weight is 3 and the second weight is 1.

Example 52: The method of example 50, wherein the first weight is 5 and the second weight is 3.

Example 53: The method of any of examples 1-52, further comprising determining the first weight and the second weight according to a size of the current block.

Example 54: The method of example 53, wherein the size of the current block comprises a minimum of a width of the current block a height of the current block.

Example 55: The method of example 53, wherein the size of the current block comprises a maximum of a width of the current block a height of the current block.

Example 56: The method of example 53, wherein the size of the current block comprises a product of a width of the current block a height of the current block.

Example 57: The method of example 53, wherein the size of the current block comprises a sum of a width of the current block a height of the current block.

Example 58: The method of any of examples 53-57, wherein determining the first weight and the second weight comprises setting the first weight higher than the second weight when the size of the block is higher than a predefined threshold.

Example 59: The method of example 58, wherein the first weight is 3 and the second weight is 1.

Example 60: The method of example 58, wherein the first weight is 5 and the second weight is 3.

Example 61: The method of any of examples 53-57, wherein determining the first weight and the second weight comprises setting the second weight higher than the first weight when the size of the block is higher than a predefined threshold.

Example 62: The method of example 61, wherein the second weight is 3 and the first weight is 1.

Example 63: The method of example 61, wherein the second weight is 5 and the first weight is 3.

Example 64: The method of any of examples 53-57, wherein determining the first weight and the second weight comprises setting the first weight higher than the second weight when the size of the block is lower than a predefined threshold.

Example 65: The method of example 64, wherein the first weight is 3 and the second weight is 1.

Example 66: The method of example 64, wherein the first weight is 5 and the second weight is 3.

Example 67: The method of any of examples 53-57, wherein determining the first weight and the second weight comprises setting the second weight higher than the first weight when the size of the block is lower than a predefined threshold.

Example 68: The method of example 67, wherein the second weight is 3 and the first weight is 1.

Example 69: The method of example 67, wherein the second weight is 5 and the first weight is 3.

Example 70: The method of any of examples 1-69, further comprising coding data of a bitstream representing the first weight and the second weight.

Example 71: The method of example 70, wherein the data of the bitstream comprises at least one of a sequence parameter set, a picture parameter set, an adaptation parameter set, a video parameter set, a picture header, a slice header, a tile header, or a block header.

Example 72: A device for coding video data, the device comprising one or more means for performing the method of any of examples 1-71.

Example 73: The device of example 72, wherein the one or more means comprise one or more processors implemented in circuitry.

Example 74: The device of example 72, further comprising a display configured to display decoded video data.

Example 75: The device of example 72, wherein the device comprises one or more of a camera, a computer, a mobile device, a broadcast receiver device, or a set-top box.

Example 76: The device of example 72, further comprising a memory configured to store video data.

Example 77: A device for encoding video data, the device comprising: means for forming an inter-prediction block for a current block of video data; means for forming an intra-prediction block for the current block of video data; means for applying a first weight to the inter-prediction block and a second weight to the intra-prediction block; means for combining the first weighted inter-prediction block and the second weighted intra-prediction block to form a prediction block for the current block; and means for coding the current block using the prediction block.

Example 78: A computer-readable storage medium having stored thereon instructions that, when executed, cause a processor to perform the method of any of examples 1-71.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   forming an inter-prediction block for a current luminance block of video data;
   forming an intra-prediction block for the current luminance block of the video data; determining whether a first neighboring block to the current luminance block is intra-prediction coded;

determining whether a second neighboring block to the current luminance block is intra-prediction coded;
determining, based on whether at least one of the first neighboring block or the second neighboring block is intra-prediction coded, a first weight and a second weight;
applying the first weight to the inter-prediction block and the second weight to the intra-prediction block;
combining the first weighted inter-prediction block and the second weighted intra-prediction block to form a prediction block for the current luminance block; and
coding the current luminance block using the prediction block, wherein determining whether the first neighboring block is intra-prediction coded comprises determining whether the first neighboring block is coded according to a first intra-prediction mode other than intra-block copy or combined intra-inter prediction, and wherein determining whether the second neighboring block is intra-prediction coded comprises determining whether the second neighboring block is coded using a second intra-prediction mode other than intra-block copy or combined intra-inter prediction.

2. A method of coding video data, the method comprising:
forming an inter-prediction block for a current luminance block of video data;
forming an intra-prediction block for the current luminance block of the video data;
determining whether a first neighboring block to the current luminance block is intra- prediction coded;
determining whether a second neighboring block to the current luminance block is intra-prediction coded;
determining, based on whether at least one of the first neighboring block or the second neighboring block is intra-prediction coded, a first weight and a second weight;
applying the first weight to the inter-prediction block and the second weight to the intra-prediction block;
combining the first weighted inter-prediction block and the second weighted intra- prediction block to form a prediction block for the current luminance block; and
coding the current luminance block using the prediction block, wherein determining whether the first neighboring block is intra-prediction coded comprises determining whether the first neighboring block is coded according to a first intra-prediction mode other than combined intra-inter prediction, and wherein determining whether the second neighboring block is intra-prediction coded comprises determining whether the second neighboring block is coded using a second intra-prediction mode other than combined inter-intra prediction.

3. The method of claim 1, wherein determining the first weight and the second weight further comprises determining the first weight and the second weight according to a luminance block of one of the first neighboring block or the second neighboring block based on the one of the first neighboring block or the second neighboring block having single luma-chroma coding tree or dual luma-chroma coding tree enabled.

4. The method of claim 1, wherein the first neighboring block comprises an above-neighboring block, and wherein the second neighboring block comprises a left-neighboring block.

5. The method of claim 1, wherein determining the first weight and the second weight comprises determining the first weight and the second weight according to whether a merge indexed block is predicted using uni-directional prediction or bi-directional prediction.

6. The method of claim 1, wherein determining the first weight and the second weight comprises determining the first weight and the second weight according to a size of the current luminance block.

7. The method of claim 1, further comprising coding data of a bitstream representing the first weight and the second weight.

8. The method of claim 7, wherein the data of the bitstream comprises at least one of a sequence parameter set, a picture parameter set, an adaptation parameter set, a video parameter set, a picture header, a slice header, a tile header, or a block header.

9. The method of claim 1, wherein coding the current luminance block comprises decoding the current luminance block, and wherein the method further comprises:
decoding a residual block for the current luminance block; and
combining samples of the residual block with samples of the prediction block.

10. The method of claim 1, wherein coding the current luminance block comprises encoding the current luminance block, comprising:
subtracting samples of the prediction block from samples of the current luminance block to form a residual block; and
encoding the residual block.

11. A device for coding video data, the device comprising:
a memory for storing video data; and
one or more processors implemented in circuitry and configured to:
form an inter-prediction block for a current luminance block of the video data;
form an intra-prediction block for the current luminance block of the video data;
determine whether a first neighboring block to the current luminance block is intra-prediction coded;
determine whether a second neighboring block to the current luminance block is intra-prediction coded;
determine, based on whether at least one of the first neighboring block or the second neighboring block is intra-prediction coded, a first weight and a second weight;
apply the first weight to the inter-prediction block and the second weight to the intra-prediction block;
combine the first weighted inter-prediction block and the second weighted intra-prediction block to form a prediction block for the current luminance block; and
code the current luminance block using the prediction block, wherein the one or more processors is configured to determine whether the first neighboring block is coded according to a first intra-prediction mode other than intra-block copy or combined intra-inter prediction and to determine whether the second neighboring block is coded using a second intra-prediction mode other than intra-block copy or combined intra-inter prediction.

12. A device for coding video data, the device comprising:
a memory for storing video data; and
one or more processors implemented in circuitry and configured to:
form an inter-prediction block for a current luminance block of the video data;
form an intra-prediction block for the current luminance block of the video data;

determine whether a first neighboring block to the current luminance block is intra-prediction coded;
determine whether a second neighboring block to the current luminance block is intra-prediction coded;
determine, based on whether at least one of the first neighboring block or the second neighboring block is intra-prediction coded, a first weight and a second weight;
apply the first weight to the inter-prediction block and the second weight to the intra-prediction block;
combine the first weighted inter-prediction block and the second weighted intra-prediction block to form a prediction block for the current luminance block; and
code the current luminance block using the prediction block, wherein the one or more processors is configured to determine whether the first neighboring block is coded according to a first intra-prediction mode other than combined intra-inter prediction, and to determine whether the second neighboring block is coded using a second intra-prediction mode other than combined inter-intra prediction.

13. The device of claim 12, wherein the one or more processors is configured to determine the first weight and the second weight according to a luminance block of one of the first neighboring block or the second neighboring block based on the one of the first neighboring block or the second neighboring block having single luma-chroma coding tree or dual luma-chroma coding tree enabled.

14. The device of claim 11, wherein the first neighboring block comprises an above-neighboring block, and wherein the second neighboring block comprises a left-neighboring block.

15. The device of claim 11, wherein the one or more processors is configured to determine the first weight and the second weight according to whether a merge indexed block is predicted using uni-directional prediction or bi-directional prediction.

16. The device of claim 11, wherein the one or more processors is configured to determine the first weight and the second weight according to a size of the current luminance block.

17. The device of claim 11, wherein the one or more processors is further configured to code data of a bitstream representing the first weight and the second weight.

18. The device of claim 17, wherein the data of the bitstream comprises at least one of a sequence parameter set, a picture parameter set, an adaptation parameter set, a video parameter set, a picture header, a slice header, a tile header, or a block header.

19. The device of claim 11, wherein the one or more processors is configured to decode the current luminance block, and to decode the current luminance block, the one or more processors is configured to:
decode a residual block for the current luminance block; and
combine samples of the residual block with samples of the prediction block.

20. The device of claim 11, wherein the one or more processors is configured to encode the current luminance block, and to encode the current luminance block, the one or more processors is configured to:
subtract samples of the prediction block from samples of the current luminance block to form a residual block; and
encode the residual block.

21. A non-transitory computer-readable storage medium having stored thereon instructions that, when executed, cause a processor to:
form an inter-prediction block for a current luminance block of video data;
form an intra-prediction block for the current luminance block of the video data; determine whether a first neighboring block to the current luminance block is intra-prediction coded;
determine whether a second neighboring block to the current luminance block is intra- prediction coded;
determine, based on whether at least one of the first neighboring block or the second neighboring block is intra-prediction coded, a first weight and a second weight;
apply the first weight to the inter-prediction block and the second weight to the intra-prediction block;
combine the first weighted inter-prediction block and the second weighted intra-prediction block to form a prediction block for the current luminance block; and
code the current luminance block using the prediction block, wherein the instructions that cause the processor to determine whether the first neighboring block is intra-prediction coded comprise instructions that cause the processor to determine whether the first neighboring block is coded according to a first intra-prediction mode other than intra-block copy or combined intra-inter prediction, and wherein the instructions that cause the processor to determine whether the second neighboring block is intra-prediction coded comprise instructions that cause the processor to determine whether the second neighboring block is coded using a second intra-prediction mode other than intra-block copy or combined intra-inter prediction.

22. A non-transitory computer-readable storage medium having stored thereon instructions that, when executed, cause a processor to:
form an inter-prediction block for a current luminance block of video data;
form an intra-prediction block for the current luminance block of the video data;
determine whether a first neighboring block to the current luminance block is intra-prediction coded;
determine whether a second neighboring block to the current luminance block is intra-prediction coded;
determine, based on whether at least one of the first neighboring block or the second neighboring block is intra-prediction coded, a first weight and a second weight;
apply the first weight to the inter-prediction block and the second weight to the intra-prediction block;
combine the first weighted inter-prediction block and the second weighted intra-prediction block to form a prediction block for the current luminance block; and
code the current luminance block using the prediction block, wherein the instructions that cause the processor to determine whether the first neighboring block is intra-prediction coded comprise instructions that cause the processor to determine whether the first neighboring block is coded according to a first intra-prediction mode other than combined intra-inter prediction, and wherein the instructions that cause the processor to determine whether the second neighboring block is intra-prediction coded comprise instructions that cause the processor to determine whether the second neighboring block is coded using a second intra-prediction mode other than combined inter-intra prediction.

23. The non-transitory computer-readable storage medium of claim 21, wherein the instructions that cause the processor to determine the first weight and the second weight further comprise instructions that cause the processor to determine the first weight and the second weight according to a luminance block of one of the first neighboring block or the second neighboring block based on the one of the first neighboring block or the second neighboring block having single luma-chroma coding tree or dual luma-chroma coding tree enabled.

24. The non-transitory computer-readable storage medium of claim 21, wherein the first neighboring block comprises an above-neighboring block, and wherein the second neighboring block comprises a left-neighboring block.

25. The non-transitory computer-readable storage medium of claim 21, wherein the instructions that cause the processor to determine the first weight and the second weight comprise instructions that cause the processor to determine the first weight and the second weight according to whether a merge indexed block is predicted using uni-directional prediction or bi-directional prediction.

26. The non-transitory computer-readable storage medium of claim 21, wherein the instructions that cause the processor to determine the first weight and the second weight comprise instructions that cause the processor to determine the first weight and the second weight according to a size of the current luminance block.

27. The non-transitory computer-readable storage medium of claim 21, further comprising instructions that cause the processor to code data of a bitstream representing the first weight and the second weight.

28. The non-transitory computer-readable storage medium of claim 27, wherein the data of the bitstream comprises at least one of a sequence parameter set, a picture parameter set, an adaptation parameter set, a video parameter set, a picture header, a slice header, a tile header, or a block header.

29. The non-transitory computer-readable storage medium of claim 21, wherein the instructions that cause the processor to code the current luminance block comprise instructions that cause the processor to decode the current luminance block, comprising instructions that cause the processor to:
  decode a residual block for the current luminance block; and
  combine samples of the residual block with samples of the prediction block.

30. The non-transitory computer-readable storage medium of claim 21, wherein the instructions that cause the processor to code the current luminance block comprise instructions that cause the processor to encode the current luminance block, comprising instructions that cause the processor to:
  subtract samples of the prediction block from samples of the current luminance block to form a residual block; and
  encode the residual block.

31. A device for coding video data, the device comprising:
  means for forming an inter-prediction block for a current luminance block of video data;
  means for forming an intra-prediction block for the current luminance block of the video data;
  means for determining whether a first neighboring block to the current luminance block is intra-prediction coded;
  means for determining whether a second neighboring block to the current luminance block is intra-prediction coded;
  means for determining, based on whether at least one of the first neighboring block or the second neighboring block is intra-prediction coded, a first weight and a second weight;
  means for applying the first weight to the inter-prediction block and the second weight to the intra-prediction block;
  means for combining the first weighted inter-prediction block and the second weighted intra-prediction block to form a prediction block for the current luminance block; and
  means for coding the current luminance block using the prediction block, wherein the means for determining whether the first neighboring block is intra- prediction coded comprises means for determining whether the first neighboring block is coded according to a first intra-prediction mode other than intra-block copy or combined intra-inter prediction, and wherein the means for determining whether the second neighboring block is intra-prediction coded comprises means for determining whether the second neighboring block is coded using a second intra-prediction mode other than intra-block copy or combined intra-inter prediction.

32. A device for coding video data, the device comprising:
  means for forming an inter-prediction block for a current luminance block of video data;
  means for forming an intra-prediction block for the current luminance block of the video data;
  means for determining whether a first neighboring block to the current luminance block is intra-prediction coded;
  means for determining whether a second neighboring block to the current luminance block is intra-prediction coded;
  means for determining, based on whether at least one of the first neighboring block or the second neighboring block is intra-prediction coded, a first weight and a second weight;
  means for applying the first weight to the inter-prediction block and the second weight to the intra-prediction block;
  means for combining the first weighted inter-prediction block and the second weighted intra-prediction block to form a prediction block for the current luminance block; and
  means for coding the current luminance block using the prediction block, wherein the means for determining whether the first neighboring block is intra-prediction coded comprises means for determining whether the first neighboring block is coded according to a first intra-prediction mode other than combined intra-inter prediction, and wherein the means for determining whether the second neighboring block is intra-prediction coded comprises means for determining whether the second neighboring block is coded using a second intra-prediction mode other than combined inter-intra prediction.

33. The device of claim 31, wherein the means for determining the first weight and the second weight further comprises means for determining the first weight and the second weight according to a luminance block of one of the first neighboring block or the second neighboring block based on the one of the first neighboring block or the second neighboring block having single luma-chroma coding tree or dual luma-chroma coding tree enabled.

34. The device of claim 31, wherein the first neighboring block comprises an above-neighboring block, and wherein the second neighboring block comprises a left-neighboring block.

35. The device of claim 31, wherein the means for determining the first weight and the second weight comprises means for determining the first weight and the second weight according to whether a merge indexed block is predicted using uni-directional prediction or bi-directional prediction.

36. The device of claim 31, wherein the means for determining the first weight and the second weight comprises means for determining the first weight and the second weight according to a size of the current luminance block.

37. The device of claim 31, further comprising means for coding data of a bitstream representing the first weight and the second weight.

38. The device of claim 37, wherein the data of the bitstream comprises at least one of a sequence parameter set, a picture parameter set, an adaptation parameter set, a video parameter set, a picture header, a slice header, a tile header, or a block header.

39. The device of claim 31, wherein the means for coding the current luminance block comprises means for decoding the current luminance block that comprises:
- means for decoding a residual block for the current luminance block; and
- means for combining samples of the residual block with samples of the prediction block.

40. The device of claim 31, wherein the means for coding the current luminance block comprises means for encoding the current luminance block, comprising:
- means for subtracting samples of the prediction block from samples of the current luminance block to form a residual block; and
- means for encoding the residual block.

* * * * *